United States Patent [19]

Artweger

[11] 4,210,122

[45] Jul. 1, 1980

[54] ENERGY CONVERSION APPARATUS

[75] Inventor: Wolfgang Artweger, Windischgarsten, Austria

[73] Assignee: Artweger-Industrie-gesellschaft m.b.H., Windischgarsten, Austria

[21] Appl. No.: 823,497

[22] Filed: Aug. 10, 1977

[30] Foreign Application Priority Data

Aug. 11, 1976 [AT] Austria ............................ 5982/76
Aug. 11, 1976 [AT] Austria ............................ 5983/76
Aug. 11, 1976 [AT] Austria ............................ 5984/76

[51] Int. Cl.$^2$ ............................................. F24J 3/02
[52] U.S. Cl. ................................... 126/432; 126/448; 126/450
[58] Field of Search ............... 126/270, 271; 237/1 A; 165/48, 29; 52/533, 540

[56] References Cited

U.S. PATENT DOCUMENTS

| | | | |
|---|---|---|---|
| 3,893,506 | 7/1975 | Laing | 237/1 A |
| 3,965,887 | 6/1976 | Gramer | 126/271 |
| 3,980,071 | 9/1976 | Barber, Jr. | 237/1 A |
| 4,069,809 | 1/1978 | Strand | 237/1 A |

Primary Examiner—James C. Yeung
Attorney, Agent, or Firm—Kurt Kelman

[57] ABSTRACT

A modular solar collector comprises a plurality of detachably interconnected modules forming a closed structural surface. Each module comprises a solar collector unit with a cavity receiving a heat carrier fluid through an inlet and delivering the heated fluid through an outlet, the inlet and out each having a coupling part. The unit is carried on a mounting plate which has a conduit portion for the fluid embedded therein. The inlet and outlet ends of the conduit portion each has a coupling part. The inlet end coupling part and the outlet coupling part, on the one hand, and the outlet end coupling part and the inlet coupling part, on the other hand, are matched for detachable assembly to form detachable joints between respective registering pairs of the coupling parts for detachably assembling the unit and the mounting plate. One of the detachable joints detachably assembles adjacent ones of the mounting elements and the conduit portions detachably joined to the cavities form a conduit system for the heat carrier fluid to and from the cavities. The unit comprises a transparent front plate, a rear plate, the plates defining the cavity therebetween, and an element arranged between the outer surface of the front plate and the inner surface of the rear plate which does not transmit solar radiation.

26 Claims, 10 Drawing Figures

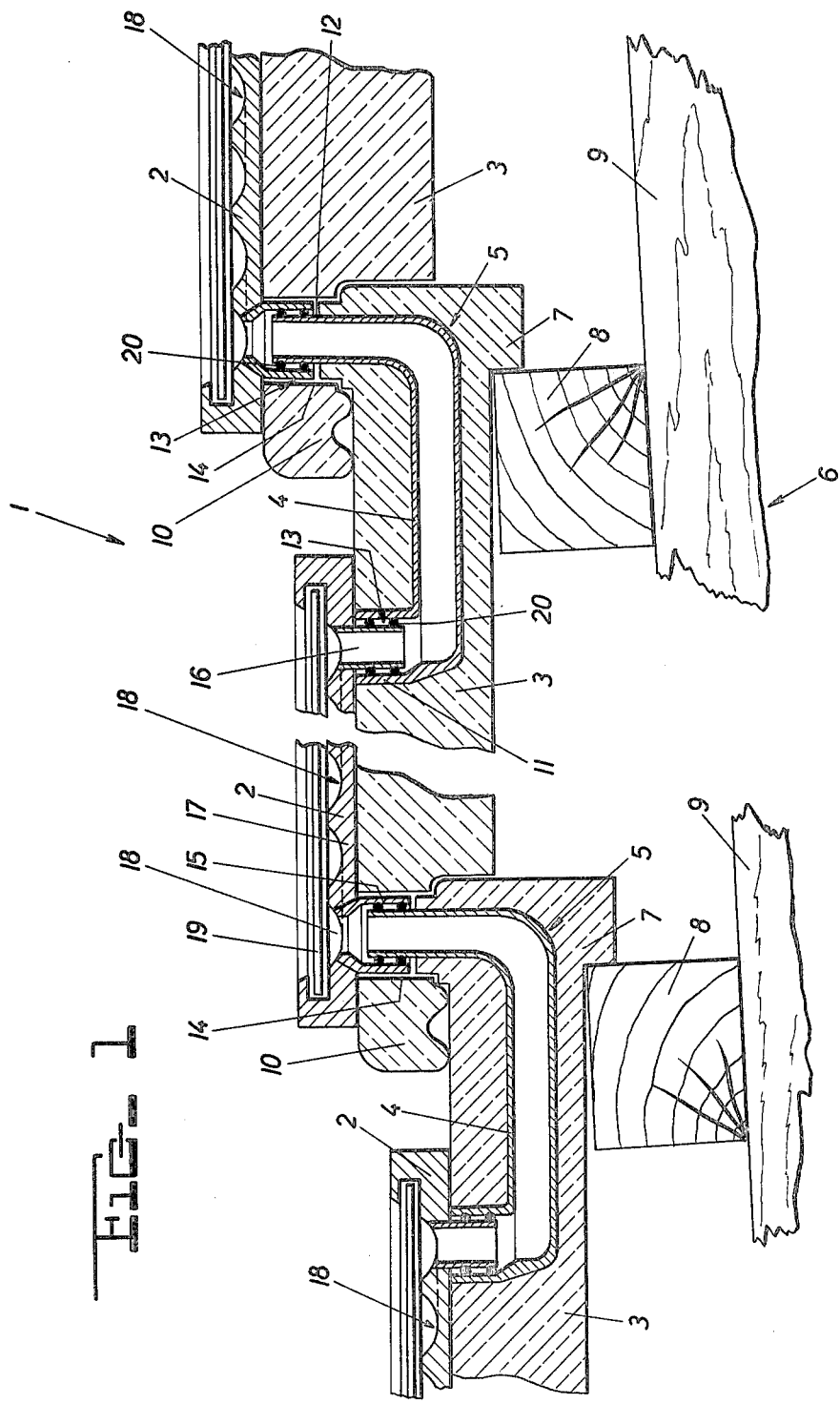

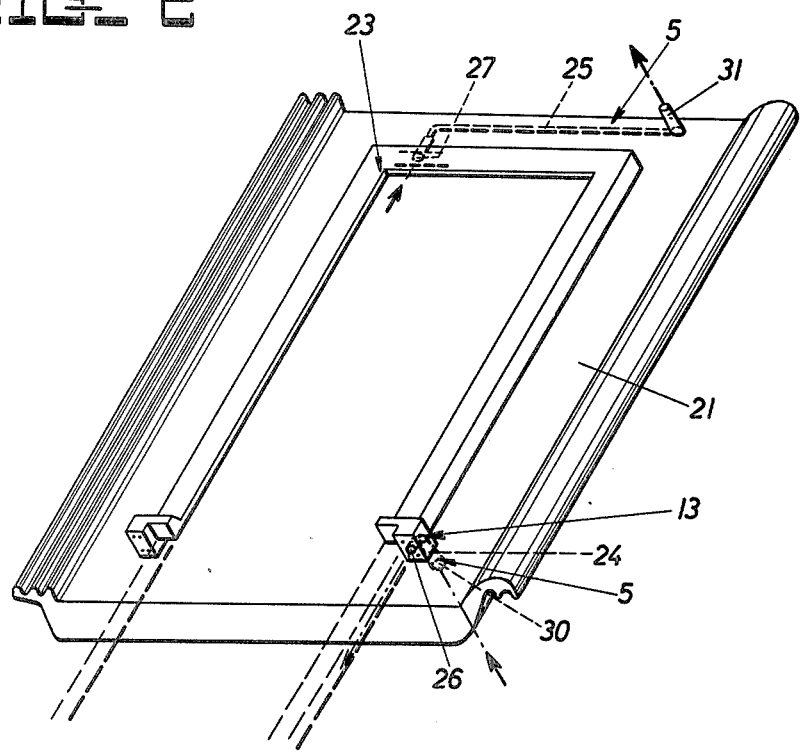
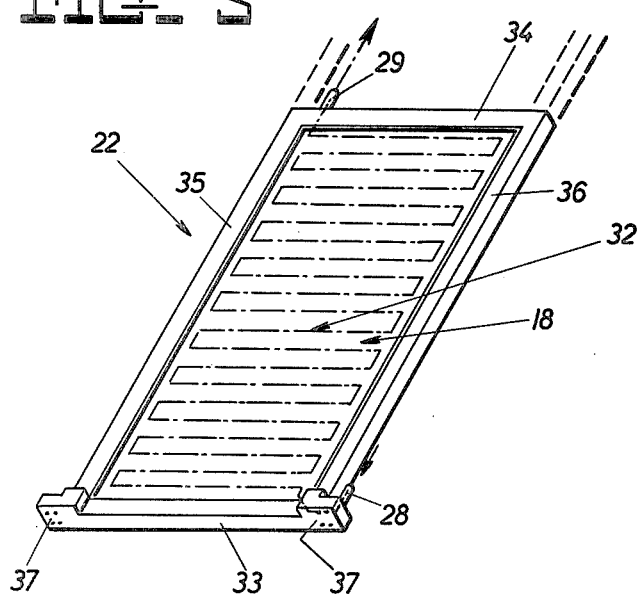

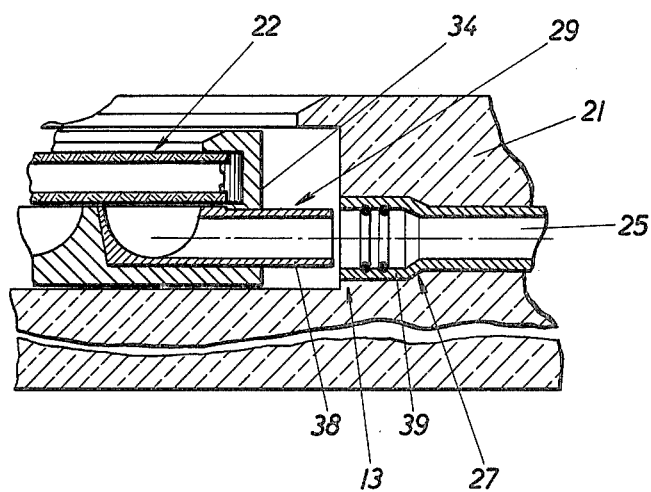
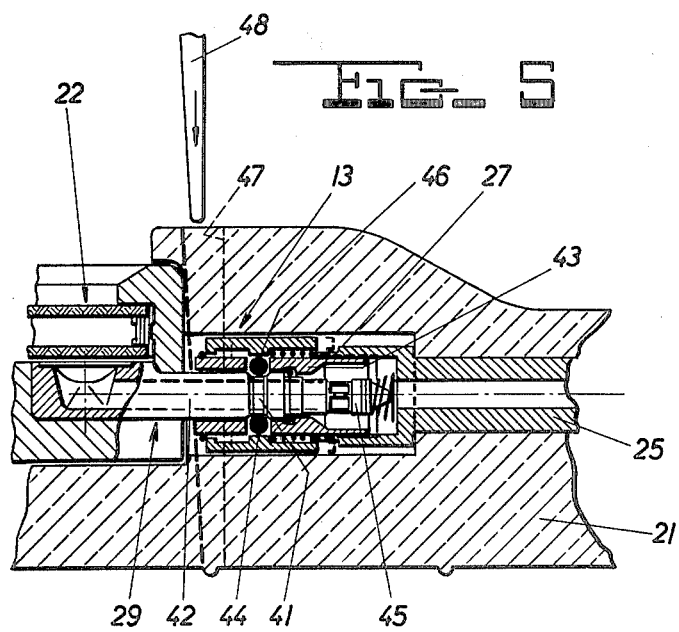

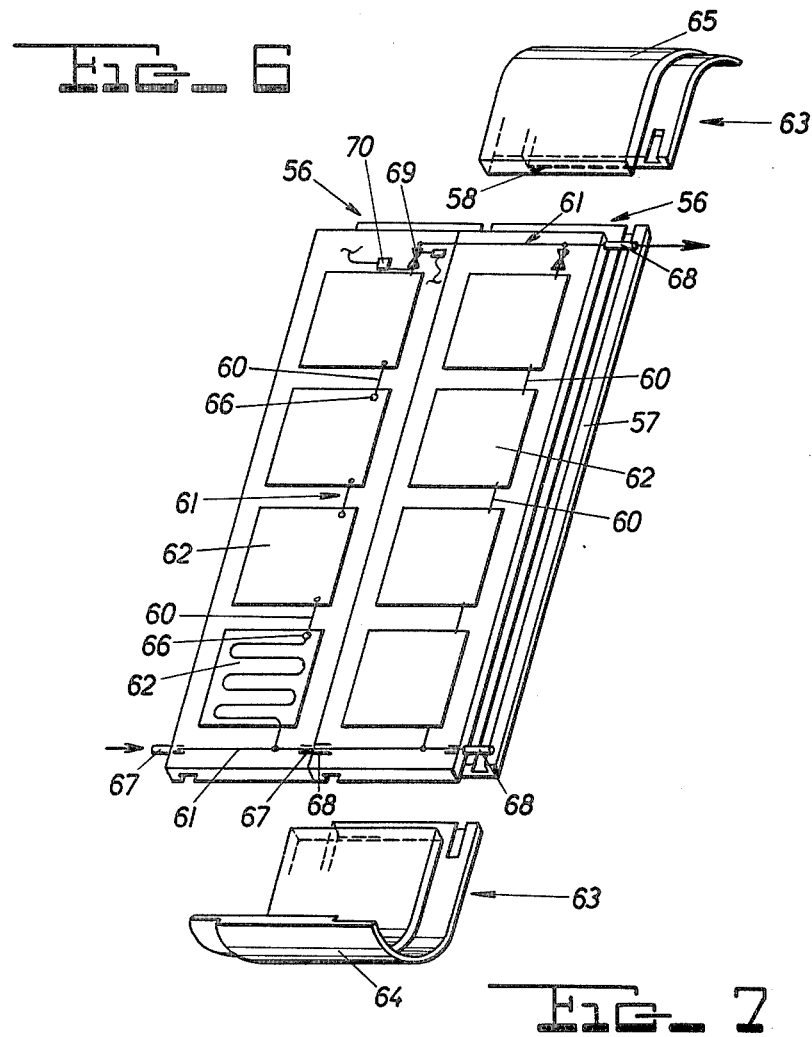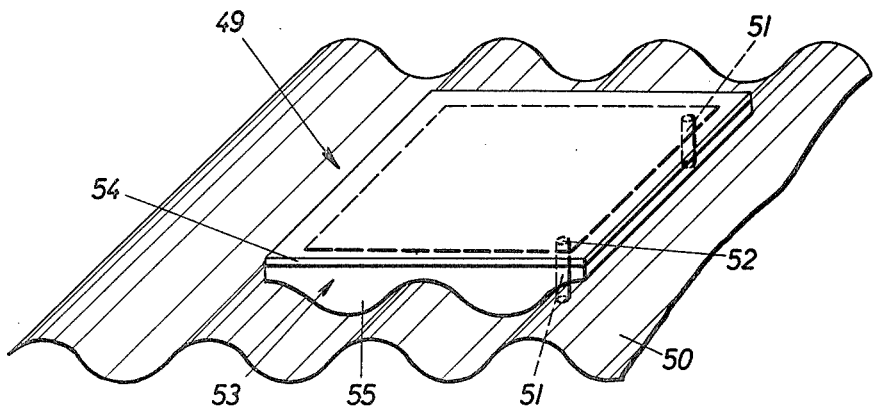

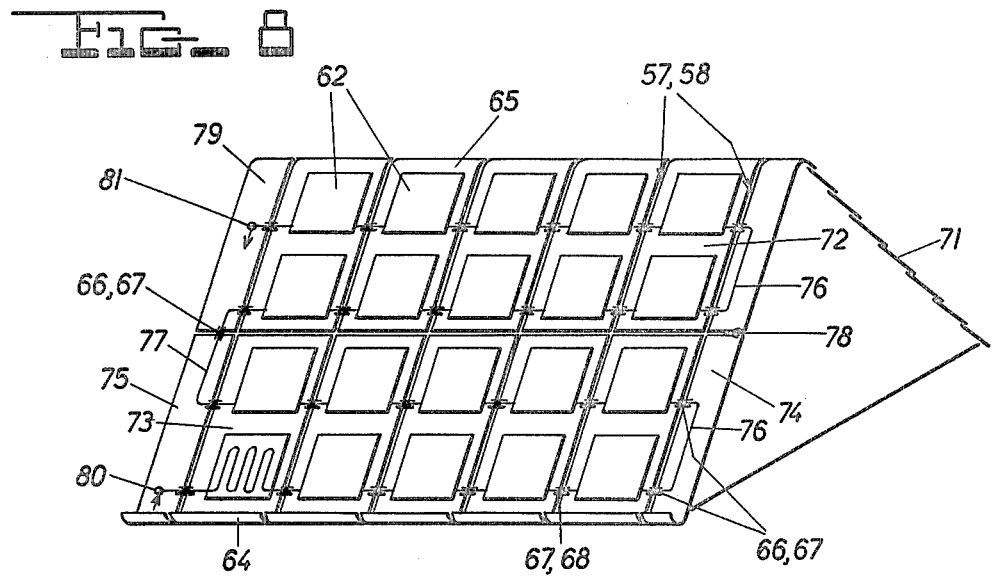
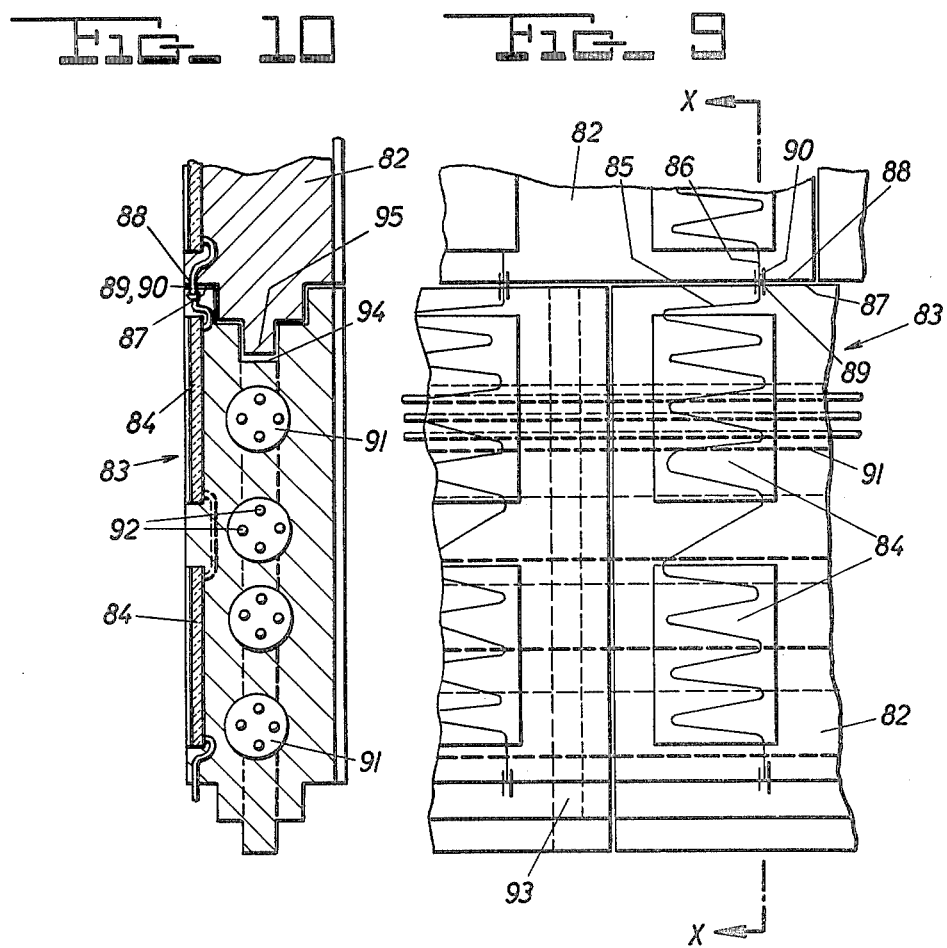

ENERGY CONVERSION APPARATUS

The present invention relates to improvements in energy conversion apparatus for converting solar into thermal energy. Such apparatus comprises modules of an energy conversion unit arranged for exposure to solar radiation and defining a cavity capable of receiving a heat carrier fluid, the unit including an inlet and an outlet for the fluid in communication with the cavity, and a mounting element carrying the energy conversion unit. A conduit delivers the heat carrier fluid, such as water or air, to the cavities and removes the heated fluid therefrom to a heat consumption system normally including a heat exchanger.

It is one primary object of this invention ro provide a modular energy conversion apparatus of this general type wherein the construction of a moisture-proof and preferably heat-insulating closed structural surface is facilitated, which may find use, for example, as a roof covering without requiring any additional structural elements.

It is a further object of the invention to minimize heat losses in the inlet and outlet conduits of the heat conversion units of such an apparatus.

It is another important object of the present invention to provide a closed modular structural surface, such as a roof covering or a wall, which is comprised of such detachably assembled modules on which the heat conversion units are detachably mounted and can be removed from their mounting elements without destroying the closed surface.

The above and other objects are accomplished in accordance with one aspect of the invention with a modular energy conversion apparatus for converting solar into thermal energy, which comprises a plurality of interconnected modules each module comprising an energy conversion unit and a mounting element carrying the unit. The energy conversion unit is arranged for exposure to solar radiation and defines a cavity capable of receiving a heat carrier fluid, the unit including an inlet and an outlet for the fluid in communication with the cavity, and the inlet and the outlet each having a coupling part. The mounting element includesa conduit portion embedded therein and having an inlet and an outlet end, the inlet and outlet ends of the conduit portion each having a coupling part. The inlet end coupling part and the outlet coupling part, on the one hand, and the outlet end coupling part and the inlet coupling part, on the other hand, are matched for detachable assembly to form detachable joints between respectively registering pairs of the coupling parts for detachably assembling the energy conversion unit and the mounting element. One of the detachable joints detachably assembles adjacent ones of the mounting elements, registering ones of the coupling parts forming the one detachable joint, and the conduit portions detachably joined to the cavities form a conduit system for the heat carrier fluid to and from the cavities.

In the closed modular structural surface constituting another aspect of this invention, each of the detachably interconnected modules forming the surface comprises an energy conversion unit arranged for exposure to solar radiation and defining a cavity capable of receiving a heat carrier fluid, and a mounting element carrying the unit and including a conduit portion embedded therein. The conduit portions join the cavities to form a conduit system for the heat carrier fluid to and from the cavities, and adjacent mounting elements are connected to form the closed surface.

Separating the energy conversion module into an energy conversion unit and a mounting element therefor makes it possible to vary the structures of the unit and/or element widely so that they may be adapted to special needs. Thus, the mounting elements may be adapted to various existing roof structures, thus making it possible to replace desired portions of such structures with the energy conversion aparatus of this invention. Complex support elements may be eliminated since the mounting elements themselves may be adapted for direct support on existing roof frames. The detachably mounted energy conversion units may be readily removed for repair, servicing or replacement. The manufacture of all parts and their assembly is simple and, therefore economical. The conduit system for the heat carrier fluid, which usually must be connected on-site by specially constructed inlet and outlet conduits is built into the mounting elements, thus being completed simply by assembling the same. The detachable conduit joints may readily be made fluid-tight and heat-insulated to avoid heat losses, and damage to the energy conversion units is avoided during assembly of the closed structural surface since the units may be mounted on the mounting elements after the same have been assembled.

In the closed modular structural surface of the present invention, the mounting elements are detachably inter-connected by complementary coupling parts of conduit portions forming the conduit system for the heat carrier fluid. The coupling parts preferably extend perpendicularly from the mounting elements, the fluid being preferably supplied through an inlet coupling part from below and being removed through an outlet coupling part from above, thus providing a thermal fluid movement component in addition to pressure applied by a pump supplying the fluid to the apparatus. Modules extending in horizontal rows may be interconnected in series while the modules in vertical rows are connected in parallel.

The above and other objects, advantages and features of the invention will become more apparent from the following detailed description of certain now preferred embodiments thereof, taken in conjunction with the accompanying drawing wherein:

FIG. 1 is a partial vertical section of a roof comprised of a modular energy conversion apparatus forming a closed structural surface according to one embodiment of this invention;

FIG. 2 is a perspective view showing another embodiment of a mounting element for the modules of the apparatus;

FIG. 3 is a similar view of an energy conversion unit fitting the mounting element of FIG. 2;

FIG. 4 is an enlarged sectional view showing one embodiment of a detachable joint;

FIG. 5 is a like view showing another embodiment of the joint;

FIG. 6 is a perspective view showing an embodiment of a large surface mounting element adapted for mounting a plurality of energy conversion units;

FIG. 7 is a perspective view of another embodiment of a mounting element for use with corrugated roof shingles;

FIG.8 is a perspective view of the roof built with the modules of FIG. 6;

FIG. 9 is a partial front view of a wall assembled from modules according to the invention; and FIG. 10 is a section along line X—X of FIG. 9.

Referring now to the drawing and first to FIG. 1, there is shown an energy conversion apparatus 1 for converting solar into thermal energy. This apparatus is comprised of a series of energy conversion units 2 each consisting of a solar radiation collector and of associated mounting elements 3. Each mounting element receives an associated energy conversion unit and, in the illustrated embodiment, is an essentially plate-shaped body. At least the upper surface of this body, and in the illustrated embodiment the entire body, is of a moisture-impervious and thermally insulating material. A rigid synthetic resin, preferably a plastic foam, is a very useful material for the mounting elements. Mounting elements of such material can serve as roof coverings if the apparatus is disposed on a roof and may thus save roof tiles or other roof coverings.

Conduit system 5, through which a heat carrier fluid is passed, comprises conduit portions 4 each embedded in a respective one mounting elements 3. The mounting elements with their embedded conduit portion may be mass produced simply in suitable molds wherein a suitable synthetic resin is molded and foamed about conduit portions 4 inserted in the mold.

Each plate-shaped mounting element 3 has an abutment 7 projecting downwardly from the lower surface of the element at one end of the element and a shoulder 10 projecting laterally from the upper surface of the element at an opposite end thereof. Such mounting elements may be assembled in series on a roof structure 6, as shown in FIG. 1, to form a roof covering which is impervious to moisture and may thus serve as an effective roof covering with or without mounting energy conversion units thereon. In this manner, all types of energy conversion units may be used without further taking into consideration the need for moisture-proofing the roof. As illustrated, roof structure 6 comprises rafters 9 and roof battens 8, and each mounting element 3 is suspended at one end on a respective batten 8 engaged by abutment 7 and supporting the lower surface of the element, and at the opposite end on the upper surface of an adjacent mounting element engaged by shoulder 10, the shoulder defining a recess in the mounting element into which the adjacent mounting element fits. Thus, the shoulder 10 of each mounting element 3 over-laps an adjacent end of an underlying mounting element. The shoulders define grooves facing the upper surfaces of the underlying mounting elements which grooves serve as water conduits for removing water from the roof structure covering.

Each conduit portion 4 has respective coupling parts 11, 12 at the ends thereof, the coupling parts extending perpendicularly to the upper surface of the mounting element wherein the conduit portion is embedded. The conduit portion of each mounting element extends from coupling part 12 in the region of the one end of the mounting element towards the opposite end thereof. The shoulder of each mounting element defines a bore 14 extending perpendicularly to the upper surface of the mounting element for receiving coupling part 12 of an adjacent mounting element, coupling part 12 projecting from the upper surface of the adjacent mounting element into bore 14 which is in registry therewith.

The illustrated energy conversion units 2 are comprised in the illustrated embodiment of rear wall 17, preferably also made of a rigid synthetic resin, and a transparent front wall 19, which may be a double-walled glass or synthetic resin plate. Such double-walled plates provide increased heat insulation and reduce radiation losses of the heat carrier to the ambient atmosphere. The walls of the unit 2 define therebetween a cavity 18 which may be constituted by a meandering channel system 18, the cross sections of the channels being substantially parabola-shaped and the focal length of the parabola being relatively short. A heat carrier fluid supplied through conduit system 5 passes through the meandering channel system 18 and solar radiation energy impinging upon transparent front wall 19 and absorbed by an underlying absorption plate heats the carrier fluid passing through the channel system, thus converting solar into heat energy. Thus, the temperature of the heat carrier fluid increases as it flows from one energy conversion unit to the next. The cavities 18 of units 2 are connected in series to conduit system 5, respective ends of each cavity having coupling parts 15, 16 arranged to form fluid-tight joints 13 with coupling parts 12, 11 of associated conduit portions 4, coupling parts 15, 16 also extending perpendicularly to the support surfaces of mounting elements 3. As shown in FIG. 1, coupling part 15 forms the inlet and coupling part 16 the outlet for each cavity 18. When solar collector 2 is placed on the upper surface of a mounting element 2 with coupling part 15 in registry with bore 14 and projecting thereinto and coupling part 16 in registry with coupling part 11 and projecting thereinto, coupling part 12 projects into coupling part 16 and the registering coupling parts form telescoping joints 13 wherein coupling parts 11 and 15 constitute sockets receiving coupling parts 16 and 12, respectively. O-rings 20 are interposed between the telescoping coupling parts to form fluid-tight joints 13 as the solar collector 2 is pressed upon the underlying mounting element into flush engagement with the upper surface thereof. If desired and preferably, any leaks may be prevented by using a silicon paste or like putty in spaces remaining along adjoining edges of units 2 and mounting elements 3 to provide air-tight joints and thus to make best use of the heat insulating property of mounting elements 3 for insulating the rear wall of the solar collectors. In this manner, the simple step of pressing the solar collectors against the mounting elements will not only couple together all the cavities of the solar collectors in series but joint 13 in bore 14 will also connect the adjoining mounting elements to each other. This will greatly facilitate the assembly and save costs, reducing the number of couplings and joints to a minimum.

If the heat-insulating material of mounting element 3 wherein conduit portion 4 is embedded is light-transparent in the direction of solar collector 2 while it is light-absorbing in the opposite direction, the heat insulation of the embedding material will not only reduce heat losses in the heat carrier fluid passing through the conduit portion but this conduit portion may actually serve for obtaining additional heat energy.

As is apparent from FIG. 1, the joined series of mounting elements 3 and their associated energy conversion units 2 form a detachable modular covering for a structure, which may be readily assembled and disassembled, the mounting elements constituting a closed surface for the structure and incorporating portions of a conduit system through which the heat carrier fluid passes.

FIGS. 2 and 3 illustrate modified embodiments of a mounting element 21 and an associated energy conversion unit 22, respectively. Mounting element 21, as illustrated in FIG. 2, has mounting and guide device 23 on the upper surface thereof for slidably guiding and mounting unit 22 thereon. The mounting element of this embodiment is a plate-shaped body similar to a roof tile and thus makes it possible to replace an existing roof covering readily with an energy conversion apparatus using mounting elements 21 for receiving energy convention units. The heat carrier fluid conduit system 5 of the embodiment shown in FIG. 2 comprises inlet conduit portion 24 and outlet conduit portion 25 embedded in mounting element 21, the inlet conduit portion 24 having coupling parts 26 and 30 at the ends thereof while outlet conduit portion 25 has respective end coupling parts 27 and 31. Coupling parts 26 and 27 extend through mounting and guide device or molding 23 and, when mounting element 21 and energy conversion unit 22 are assembled by means of molding 23, coupling parts 28 and 29 in communication with meandering channel system 32 in unit 22 are in registry with coupling parts 26 and 27, the telescoping coupling parts forming joints 13. Coupling parts 30 and 31 extend perpendicularly to the opposing surfaces of mounting element 21. When two adjacent mounting elements are connected to form a series of mounting elements in the manner of the assembly of FIG. 1, projecting coupling part 31 of one mounting element will be in registry with coupling part 30 of an adjacent and overlying mounting element, coupling part 31 telescopingly engaging coupling part 30, somewhat in the manner of coupling parts 12 and 15 of FIG. 1. While coupling parts 26 and 27 extend substantially parallel to the major surfaces of mounting element 21, coupling parts 30 and 31 extend perpendicularly thereto. The mounting elements are assembled with their associated energy conversion units simply by sliding each unit 22 along the upper surface of an associated element 21 into the open end of molding 23, and the superposed and overlapping arrangement of the tile-like elements 21 will provide a closed roof covering while conduit system 21 will interconnect cavities 18 in the energy conversion units in series in a manner equivalent to that described in connection with FIG. 1. Molding 23 enables the mounting elements 21 and energy conversion units 22 to be plugged together, units 22 being shaped and dimensioned to fit into molding 23.

By arranging the coupling parts of the inlet as well as the outlet conduits in the mounting element and the energy conversion unit, respectively, in registry, when assembled, the simple assembly of the mounting element and the energy conversion unit will provide a module in which the heat carrier fluid conduit system is fully connected. In this arrangement, inlet conduit coupling part 28 and outlet conduit coupling part 29 of energy conversion unit 22 are parallel to each other and extend perpendicularly to transverse edges 33 and 34 of the unit whence they project. While three edges of the unit, i.e. transverse edge 34 and longitudinal edges 35 and 36, are grooved guide elements fitting three-sided molding 23, which enables unit 22 to be snapped onto mounting element 21, the fourth edge, i.e. transverse edge 33, fits the open side of molding 23 and holds inlet conduit coupling part 28. Transverse edge 33 has bores 37 for receiving fastening elements, such as screws or bolts, for fastening unit 22 on mounting element 21, aligned bores being provided in the two ends of molding 23 to receive the fastening elements.

With the tile-like mounting elements 21, it is possible first to cover an entire roof by assembling the elements in overlapping relationship, rows of such elements being interlocked by telescoping joints formed by the coupling part 31 of one element projecting into coupling part 30 of an adjoining overlying element, while the longitudinal rims of the elements of one row overlap and engage the longitudinal rims of the elements in the adjacent row. In this manner, a closed roof covering is produced and energy conversion units 22 may then be simply mounted on the mounting elements by pressing them onto moldings 23 serving as mounting and guide devices for units 22, this mounting automatically interconnecting the coupling parts in the mounting elements and the energy conversion units to complete the conduit system for the heat carrier fluid. Units 22 are securely maintained in position by driving fasteners into bores 37. If desired, edges 34 to 36 and/or molding 23 may be grooved to permit application of putty or like sealant to provide good moisture insulation between mounting elements 21 and energy conversion units 22.

FIG. 4 illustrates a specific embodiment of a joint between the coupling parts of the mounting element and the energy conversion unit. Applied to outlet coupling part 29 of unit 22 and coupling part 27 of mounting element 21 of FIGS. 2 and 3, this enlarged sectional view of the joint shows the coupling part 29 to include tubular part 38 projecting perpendicularly from transverse edge 34 of unit 22 while the coupling part 27 embedded in mounting element 21 is a sleeve 39 arranged to receive tubular part 38. A fluid-tight joing is assured by arranging O-rings 39 in grooves in sleeve 39 for gripping the tubular part inserted therein telescopingly when unit 22 is slid or plugged into the mounting element.

The simple assembly of mounting element and energy conversion unit with registering coupling parts makes it possible to provide exchangeable elements and easy mounting. The telescoping joints, particularly when provided with O-rings or similar gaskets, provide fluid-tight connections which may be rapidly coupled and uncoupled. Using O-rings is very inexpensive and provides tight joints at elevated temperatures.

FIG. 5 shows a modification of the joint of FIG. 4, also applied to coupling parts 27 and 29 but obviously applicable to any joints 13 between the telescoping coupling part connections herein described. In this embodiment, coupling part 29 of energy conversion unit 22 comprises projecting tubular part 42 defining circumferentially extending, annular groove 41. Coupling part 27 embedded in mounting element 21 comprises sleeve 43 for telescopingly receiving tubular part 42. Fixing device 44 is mounted on sleeve 43 and is arranged to hold tubular part 42 in position when it is inserted in sleeve 43 but to permit ready uncoupling and withdrawal of part 42 from sleeve 43. The illustrated fixing device comprises a bush mounted on sleeve 43 and radially yieldably holding locking balls 46. The locking balls are snapped through apertures in sleeve 43 into groove 41 when tubular part 42 is telescoped into sleeve 43 but permit ready withdrawal of part 42 from sleeve 43. This may be readily accomplished by providing slot 47 in mounting element 21, insertion of an operating wedge 48 into slot 47 in a direction perpendicular to joint 13 pressing unit 22 away from coupling part 27, radial movement of balls 46 out of groove 41 uncoupling the joint. This arrangement will assure that the joint will remain securely in position even under adverse ambient conditions, such as strong winds or pressure of snow laying on the roof, while permitting ready uncoupling for repair work, for example.

To prevent heat carrier fluid from escaping from conduit 25 in mounting element 21 when energy conversion unit 22 is detached, coupling part 27 has mounted therein a spring-biased check valve 45 which will be moved into closing position by its spring when tubular part 42 is withdrawn from sleeve 43.

FIG. 6 illustrates an embodiment of an energy conversion apparatus particularly useful in new buildings which have no existing roof covering. For purposes of illustration, two assembled modules are shown, each comprising a mounting element 56 of relatively large surface area on which a plurality of energy conversion units 62 are mounted. Side edges 57 and 58 of mounting element 56 have dove-tailed or projecting guides 59 for connection with meshing guides on the side edges of adjoining mounting elements for assembly into a closed roof covering. Any spaces between the adjoining edges of the mounting elements are preferably filled with silicone paste or any other suitable sealant to provide a fluid-tight and thermally insulated roof.

Heat carrier fluid conduit portions 60 forming conduit system 61 are embedded in the mounting element to enable a plurality of energy conversion units 62 to be assembled thereon, the conduit joints being formed with coupling parts 66 of conduit portions 60 in the manner hereinabove described. Any of the units 62 may be detached from the mounting element for repair when such joints are used, as has been described.

It is also possible to provide end members 63 for assembly with sides edges 58 of mounting element 56, member 64 being through-shaped to serve as a gutter and member 65 being shaped to serve as coping for the roof. The coupling parts 67 and 68 leading from conduit system 61 extend perpendicularly to side edges 57 of the mounting element in opposite directions and at opposite ends, enabling them to be brought into registry with coupling parts in adjoining mounting elements when the roof covering is assembled.

As shown, pressure relief valve 69 under a thermostat control 70 may be arranged in conduit system 61 so as to avoid overheating of mounting elements 56 and control of the heat carrier fluid flow generally when the energy conversion units are assembled and detached. Additional valves may be built into the conduit system to provide desired fluid flow control.

FIG. 7 shows another embodiment of a mounting element. The mounting element 49 is comprised of corrugated asbestos shingle 50 forming a roof covering and carrying synthetic resin body 53 which preferably is a multi-layered plastic foam body mounted on the asbestos shingle. Depending on circumstances, the mounting element may be pre-fabricated by foaming multi-layered body 53 on the asbestos shingles or body 53 may be bonded to existing corrugated asbestos shingles on a roof with the use of suitable adhesive agents. The illustrated synthetic resin body 53 is a laminated body consisting, for instance, of a polyurethane foam layer 55 and a surface layer 54 of glass fiber reinforced synthetic resin.

Such multi-layered synthetic resin bodies have enhanced thermal insulating properties which provide very effective insulation and desired rigidity even when relatively thin.

FIG. 8 illustrates a saddle roof whose one side 71 has a conventional covering, for instance of roof tiles or shingles, while the other side is formed by two horizontal rows 72, 73 of energy conversion modules of the type described in connection with FIG. 6, like reference numerals designating like parts functioning in an equivalent manner. Coping members 65 are attached to the upper edges of the mounting elements of upper row 72 while gutter members 64 are attached to the lower edges of the mounting elements of lower row 73. End elements 74 and 75 are connected to the mounting elements of the modules, the elements being substantially like elements 56 but narrower and not adapted to carry energy conversion units. The have embedded therein bridging conduits 76 and 77 with coupling parts 66, 67 enabling the conduit systems 61 of two adjoining horizontal rows of modules to be connected in series. The connection of the mounting elements along butt joint 78 between the horizontal rows of mounting elements is effected in the same manner as along edges 57 and 58, i.e. by means of dove-tailed or projecting guides. A portion of bridging conduit 77 is embedded in the upper end element 75 while another portion thereof is embedded in the lower end element 75, the portions being aligned and joined by coupling parts 66, 67. The lower end element 75 has an inlet conduit 80 for delivering a heat carrier fluid to the energy conversion apparatus, the upper end element 75 having an outlet conduit 81 for the fluid.

FIGS. 9 and 10 show a wall 83 composed of assembled wall elements or plates 82, each wall plate having an outer surface carrying two rows of two energy conversion units 84 each. These units are detachably mounted on the surface of the wall plates in a manner hereinabove described, the conduit portions 85 and 86 being embedded in the wall plates near the respective abutting edges of the wall plates, the conduit portions having coupling parts 89, 90 for forming telescoping joints between the conduit portions of adjoining wall plates.

Wall plates 82 define horizontally extending bores 91 enabling reinforcing metal rods to be inserted into horizontally aligned bores in an assembled row of wall plates, the bores being filled with concrete after the wall has thus been reinforced. Vertical bores 93 may also be provided for the same purpose. Furthermore, as shown, the wall assembly may be further improved by providing a tenon-and mortise joint 94, 95 along the abutting edges of the wall plates.

In this manner, a tightly closed wall structure is produced.

What is claimed is:

1. A modular energy conversion apparatus for converting solar into thermal energy, comprising a plurality of detachably interconnected modules, each module comprising
    (a) an energy conversion unit arranged for exposure to solar radiation and defining a cavity capable of receiving a heat carrier fluid, the unit including
        (1) an inlet and an outlet for the fluid in communication with the cavity, and
        (2) the inlet and the outlet each having a coupling part, and
    (b) a mounting element carrying the energy conversion unit and including
        (1) a conduit portion embedded therein, and having an inlet and an outlet end,
        (2) the inlet and outlet ends of the conduit portion each having a coupling part,
        (3) the inlet end coupling part and the outlet coupling part, on the one hand, and the outlet end coupling part and the inlet coupling part, on the other hand, being matched for detachable assembly to form detachable joints between respectively registering pairs of the coupling parts for detachably assembling the energy conversion unit and the mounting element, and (4) one of the detachable joints detachably assembling adjacent ones of the mounting elements, registering ones of the coupling parts forming the one detachable joint, the conduit portions detachably joined to the cavities forming a conduit system for the heat carrier fluid to and from the cavities.

2. The modular energy conversion apparatus of claim 1, wherein the mounting element is a plate-shaped body having an upper surface, further comprising a mounting and guide device for the energy conversion unit on the upper surface.

3. The modular energy conversion apparatus of claim 1, wherein at least a surface region of the mounting element adjacent the energy conversion unit is of moisture-proof and thermally insulating material.

4. The modular energy conversion apparatus of claim 3, wherein the mounting element is a multi-layered synthetic resin body.

5. The modular energy conversion apparatus of claim 4, wherein the synthetic resin bocy is comprised of a polyurethane foam layer having laminated thereto a glass fiber reinforced synthetic resin surface layer.

6. The modular energy conversion apparatus of claim 1, wherein the mounting element has a shoulder projecting laterally from an upper surface thereof at one end of the element and an abutement projecting downwardly from a lower surface of the element at an opposite end thereof whereby the adjacent mounting elements may be assembled in series to form a roof covering, the shoulder of one mounting element overlapping the upper surface of the adjacent mounting element and the one detachable joint extending therethrough, and the abutements of the mounting elements being adapted for engagement with roof battens for supporting the roof covering on a roof frame structure.

7. The modular energy conversion apparatus of claim 1, wherein one of the edges of the mounting element forms a gutter and an opposite edge thereof forms a coping.

8. The modular energy conversion apparatus of claim 1, wherein the mounting element has a shoulder projecting laterally from an upper surface thereof at one end of the element whereby adjacent elements may be assembled in series with the shoulder of one element overlapping the upper surface of the underlying adjacent element, the shoulder defining a vertically extending bore to receive the one detachable joint.

9. The modular energy conversion apparatus of claim 1, wherein the mounting element in the region embedding the conduit portion is of a light-transparent material in the direction of the upper surface supporting the energy conversion unit and a light-absorbing material in a direction opposite thereto.

10. The modular energy conversion apparatus of claim 1, wherein the coupling parts extend perpendicular to the respective surfaces with which they are associated.

11. The modular energy conversion apparatus of claim 1, wherein the coupling parts forming each of the detachable joints are telescopingly assembled, and further comprising sealing members mounted in annular grooves in one of the coupling parts for forming fluid-tight joints.

12. The modular energy conversion apparatus of claim 1, wherein the coupling parts form readily detachable snap joints, and further comprising a check valve mounted in the coupling part of the conduit portion and operable to close the conduit portion upon detachment of the coupling parts from each other.

13. The modular energy conversion apparatus of claim 12, further comprising a fixing device for detachably holding the coupling parts together, the fixing device being mounted on the coupling part of the conduit portion, and the mounting element defining an aperture adapted to receive a tool for making the fixing device inoperative.

14. A closed modular structural surface including energy conversion apparatus for converting solar into thermal energy, comprising a plurality of detachably interconnected modules forming the surface, each module comprising (a) an energy conversion unit arranged for exposure to solar radiation and defining a cavity capable of receiving a heat carrier fluid, and (b) a mounting element carrying the energy conversion unit and including (1) a conduit portion embedded therein, the conduit portion joining the cavity to form a conduit system for the heat carrier fluid to and from the cavity, (2) first means to connect adjacent ones of the mounting elements to form the closed surface and second means to interconnect the conduit portions of the connected mounting elements, and (3) said first means detachably mounting the energy conversion unit on the mounting element and said second means detachably joining the conduit portion to the cavity.

15. The closed modular structural surface of claim 14, wherein the ends of the conduit portion have coupling parts complementary to respective ends of the cavity.

16. The closed modular structural surface of claim 15, wherein the mounting elements are arranged in superposed horizontal rows, the complementary coupling parts extending vertically.

17. The closed modular structural surface of claim 14, wherein the conduit system comprised of the conduit portions in the connected mounting elements has respective inlet and outlet end couplings for the heat carrier fluid.

18. The closed modular structural surface of claim 14, wherein the mounting elements are arranged in respective horizontal rows, the conduit portions having horizontally extending conduit parts for detachably joining the coupling portions of adjacent ones of the elements.

19. The closed modular structural surface of claim 18, wherein the mounting elements are arranged in adjacent horizontal rows, each one of the adjacent rows having a respective end mounting element, the conduit portions in the end mounting elements being connected to each other.

20. The closed modular structural surface of claim 14, wherein the mounting elements are plate-shaped bodies arranged in overlapping relationship to form a roof covering.

21. The closed modular structural surface of claim 20, wherein the mounting elements have shoulders projecting from one end thereof and overlapping an underlying end of an adjacent ones of the mounting elements.

22. The closed modular structural surface of claim 20, wherein the plate-shaped bodies are roof tiles.

23. The closed modular structural surface of claim 14, wherein the mounting elements are plate-shaped bodies arranged in a plane and abuttingly joined along adjoining edges thereof.

24. The closed modular structural surface of claim 23, further comprising a sealing material in the abutting joints.

25. The closed modular structural surface of claim 23, wherein the plate-shaped bodies form a wall, each of the bodies defining bores in registry with the bores in the adjoining bodies, and elongated reinforcement elements passing through the bores and held therein.

26. The closed modular structural surface of claim 14, further comprising at respective ends thereof elements complementary to the mounting elements but carrying no energy conversion units, conduit portions being embedded in the end elements for connection to the conduit portions in the adjacent mounting elements.

* * * * *